(12) United States Patent (10) Patent No.: US 8,799,760 B2
Proux et al. (45) Date of Patent: Aug. 5, 2014

(54) SMART MACROS USING ZONE SELECTION INFORMATION AND PATTERN DISCOVERY

(75) Inventors: Denys Proux, Eybens (FR); Claude Roux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 312 days.

(21) Appl. No.: 13/314,467

(22) Filed: Dec. 8, 2011

(65) Prior Publication Data

US 2013/0151939 A1 Jun. 13, 2013

(51) Int. Cl.
*G06F 17/00* (2006.01)

(52) U.S. Cl.
USPC ............ 715/212; 715/217; 715/224; 715/256

(58) Field of Classification Search
CPC . G06F 17/243; G06F 11/3438; G06F 21/554; G06F 17/246
USPC .................................. 715/212, 224, 226, 256
See application file for complete search history.

(56) References Cited

U.S. PATENT DOCUMENTS

| | | | | |
|---|---|---|---|---|
| 5,706,457 | A * | 1/1998 | Dwyer et al. ................. | 715/835 |
| 6,401,056 | B1 * | 6/2002 | Sirois ........................... | 702/184 |
| 6,820,023 | B1 * | 11/2004 | Klassen et al. ................ | 702/83 |
| 6,922,810 | B1 * | 7/2005 | Trower et al. ................. | 715/256 |
| 6,978,275 | B2 * | 12/2005 | Castellanos et al. .................. | 1/1 |
| 7,251,776 | B2 * | 7/2007 | Handsaker et al. ........... | 715/212 |
| 7,343,351 | B1 * | 3/2008 | Bishop et al. ................... | 705/67 |
| 7,343,551 | B1 * | 3/2008 | Bourdev ........................ | 715/224 |
| 7,881,525 | B2 * | 2/2011 | Mattausch et al. ............ | 382/159 |
| 7,971,134 | B2 * | 6/2011 | Bauchot ......................... | 715/219 |
| 8,006,176 | B2 * | 8/2011 | Reddy et al. .................. | 715/221 |
| 8,095,867 | B2 * | 1/2012 | Aureglia et al. .............. | 715/212 |
| 8,370,464 | B1 * | 2/2013 | Chitilian et al. .............. | 709/220 |
| 8,386,928 | B1 * | 2/2013 | Asch et al. .................... | 715/704 |
| 8,448,089 | B2 * | 5/2013 | Li et al. ......................... | 715/816 |
| 8,489,982 | B2 * | 7/2013 | Davis ............................ | 715/212 |
| 2002/0062342 | A1 * | 5/2002 | Sidles ........................... | 709/203 |
| 2007/0208773 | A1 * | 9/2007 | Tsao ........................ | 707/103 R |
| 2008/0034281 | A1 * | 2/2008 | Handsaker et al. ........... | 715/219 |
| 2011/0231489 | A1 * | 9/2011 | Rathod ......................... | 709/204 |

OTHER PUBLICATIONS

Yahoo "How to write an Excel macro to copy & paste from one workbook to another?" Mar. 2009 , pp. 1-3 http://answers.yahoo.com/question/index?qid=20090318200916AACM2Jv.*
Stackoverflow "Macro to export MS Word tables to Excel sheets" Dec. 2010, pp. 1-4 http://stackoverflow.com/questions/4465212/macro-to-export-ms-word-tables-to-excel-sheets?answertab=active.*

(Continued)

*Primary Examiner* — Kyle Stork
*Assistant Examiner* — Mario M Velez-Lopez
(74) *Attorney, Agent, or Firm* — Fay Sharpe LLP (57) ABSTRACT

A system and method for assisting a user to enter data are provided. The method includes detecting a user's selection of a moveable input zone on each of one or more input documents displayed on the user's screen and detecting a user's selection of a moveable target zone on a target document displayed on the user's screen. Data in the input zone(s) and the target zone is captured for one or more locations of the respective zones and a pattern is learned automatically for filling additional data in the target document based on the captured data. A fill arrangement for filling the additional data in the target document based on the learned pattern is generated, which can be presented to the user for validation.

22 Claims, 6 Drawing Sheets

(56) References Cited

OTHER PUBLICATIONS iMacros "First Steps", Jul. 23, 2011, pp. 1-8 http://wiki.imacros.net/First_Steps.*

Mrexcel.com "A Beginners Guide on how to Record, Modify and Run Your First Excel Macro", Jan. 21, 2011, pp. 1-4 http://www.mrexcel.com/articles/record-modify-run-excel-macro.php.*

* cited by examiner

SMART MACROS USING ZONE SELECTION INFORMATION AND PATTERN DISCOVERY

BACKGROUND

The exemplary embodiment relates to data manipulation and finds particular application in a system and method for generating macros for combining data from plural documents into a target document.

A common task in office environments is in the creation and updating of documents with information derived from other documents. This is often performed by opening several digital documents at the same time on a computer screen and having a user identify the data to be transferred in the input documents and locate the proper locations for this data in the target document. Because documents are of different formats, the user may spend a lot of time looking back and forth between the documents to make sure the correct data is selected and that it is transferred to the correct location in the target document.

While a user may use the "copy-paste" function generally provided by computer operating systems, this may not be particularly helpful when a user is transferring small pieces of data, such as a number from a particular row and column of one table to a different row and column of another. Additionally, the task is not always the simple duplication of data but may involve structuring it differently and generating new from elements selected from different sources.

As an example, consider the case of user wishing to complete a spreadsheet with numbers about headcounts per project provided by different departments and funded by different organizations. The numbers come from one table dealing with the headcount per project, which is displayed in a web browser and from another table dealing with funding and departments displayed in a power point slide. To fill the spreadsheet, for each project, the user will perform the following subtasks: search the web page where the headcount number for a given project is located, turn to the spreadsheet and find the right column and cell where the selected headcount number is to be typed and enter it, turn to the PowerPoint slide and search for the department and funding amount, return to the spreadsheet and find the right column and cell where the selected department and funding amount are to be to typed and enter them. This process is then repeated for the next project, and so on.

These are very repetitive tasks that take time because each time the user has to isolate, in potentially large tables, the cell(s) containing the information he is looking for and then identify where he has to type this information. This can lead to errors in the documents, as well as physical problems, such as eye strain or hand strain, over time. These factors have been exacerbated by the improvements in computer power and screen size, which allow the display of even greater numbers of documents at the same time.

BRIEF DESCRIPTION

In accordance with one aspect of the exemplary embodiment, a method for assisting a user to enter data includes, for each of at least one input documents displayed on a user's screen, detecting a user's selection of a moveable input zone on the input document, and for a target document displayed on the user's screen, detecting a user's selection of a moveable target zone on the target document. The method further includes capturing data in the input zone of the at least one input document and capturing data in the target zone of the target document, the data captured in the target zone comprising data entered by the user. A pattern for filling additional data in the target document is learnt, based on the captured data. A fill arrangement for filling the additional data in the target document is generated, based on the learned pattern. One of more of the steps of the method can be performed with a computer processor.

In another aspect, a system for assisting a user to enter data includes a display screen which displays at least one input document and a target document. A moveable input zone is defined within a border displayed on the input document and a moveable target zone is defined within a border displayed on the target document. A zone selection component detects a location of the selected input zone and a location of the selected output zone on the display screen. A data capture component captures data in the input zone and captures data in the target zone in their current locations. A learning component learns a pattern for filling additional data in the target document. The pattern is learned based on the captured data for first locations of the moveable input zone and moveable target zone and on captured data for second locations of the moveable input zone and moveable target zone. A fill component is provided for proposing a fill arrangement for the additional data in the target document, based on the learned pattern.

In another aspect, a method for assisting a user to enter data includes providing for a user to define a first moveable input zone on a first input document displayed on a user's screen, a second moveable input zone on a second input document displayed on the user's screen, and a moveable target zone on a target document displayed on the user's screen and to enter data in the target document. The method further includes capturing data in the input zones of the first and second input documents in first locations of the input zones, capturing data in the target zone of the target document in a first location of the target zone, capturing data in the input zones of the first and second input documents in second locations of the input zones, and capturing data in the target zone of the target document in a second location of the target zone. A pattern for filling additional data in the target document is learnt, based on the captured data in the input zones and target zone in the first and second locations of the input and target zones and a fill arrangement for the additional data in the target document is generated based on the learned pattern.

DETAILED DESCRIPTION

Aspects of the exemplary embodiment relate to a system and method for generating macros for populating document fields based on data extracted from digital documents which may be opened at the same time on a user's screen. Each macro includes at least one filling pattern that specifies how an input sequence of data should be selected from one or more input (source) documents and mapped to an output sequence of data in an output (target) document, according to a defined procedure. In various aspects, the method includes defining selection zones on a user's computer screen which bound the regions containing data to be mapped (e.g., duplicated or otherwise used). The zones are moved by the user to new positions on the respective documents as the data in the target document is progressively entered by the user. By capturing data from the movable selection zones at different times, links between the locations of the data in source and target documents can be progressively identified and refined. A pattern learning method is employed which enables the system to propose suggestions to complete the remaining data in the target document automatically.

Figure 1:
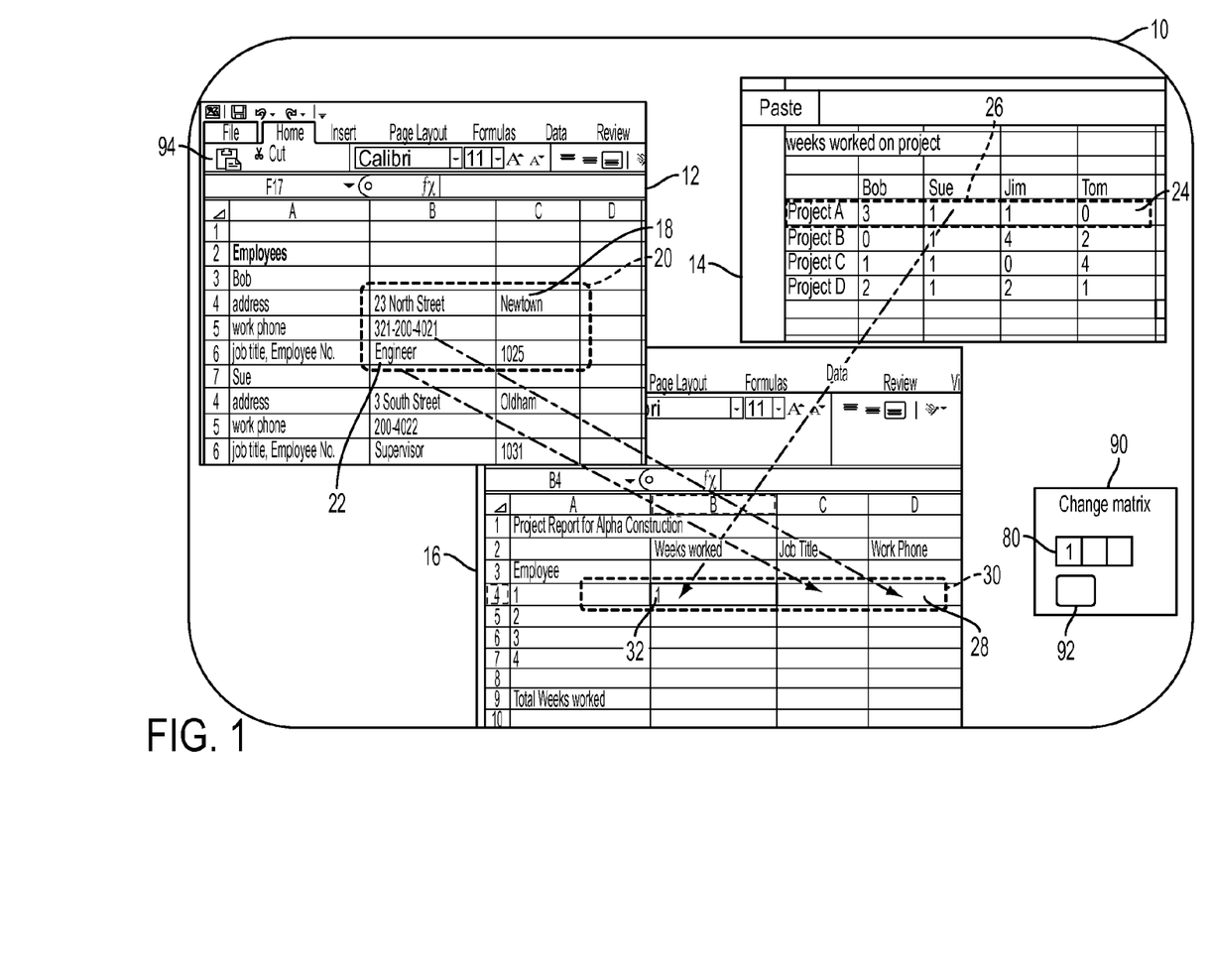
FIG. 1 illustrates a screenshot of a user's screen in accordance with one aspect of the exemplary embodiment.

FIG. 1 illustrates a screen 10 of user's display device on which are displayed a set of documents, including first and second input documents 12, 14 and a target document 16, which is in the process of being completed based on data selected from the two input documents. Each of the documents may be opened in a separate window using a conventional computer operating system. While the input and target documents are shown for convenience on the same screen it is to be appreciated that the documents may be displayed, for example on separate screens of a dual screen device, or displayed in separate windows which may be opened in turn. Additionally, the method is not limited to any particular number of input (or target) documents, although for the user's convenience, it may be desirable to have no more than about five documents being processed at a time. Further, while the illustrated documents include an Excel™ spreadsheet 12 a Word™ document 14, and an output document spreadsheet, it is to be appreciated that various types of documents, such as text (e.g., Word™ documents), slide presentation documents (e.g., Powerpoint™ documents), spreadsheets (e.g., Excel™ spreadsheets), and combinations thereof are contemplated.

As shown in FIG. 1, the user has defined a first moveable input zone 18 in the first input document 12, by drawing a frame or border 20 around a set of document fields 22 (cells, in the case of a spreadsheet document, or other defined data locations). At least some of the fields 22 include data to be used in generating the completed target document. Similarly, a second moveable input zone 24 in the second input document 14 is defined within a border 26, which contains a set of document fields 22. A moveable target zone 28 in the target document 16 is defined within a border 30, which contains a set of document fields 32 (or other defined data locations), at least some of which are to be populated with data derived from the fields 22. For example, the user has chosen to create an input zone 18 on the first input document which is two cells wide (in the horizontal direction) and four cells long (in the vertical direction), since it encloses the data he is looking for and constitutes a repeating unit of the table. He could, however, have defined a smaller zone within this larger one sufficient to include the data of interest. The virtual selection zones 18, 24, 28 can be defined on a transparent layer of the user's screen, allowing the user to view the data displayed within it.

Each input zone 18, 24, at any one time, encompasses only a portion of the data in the respective document 12, 14 which is to be used in completing the target document 16. Likewise, the target zone 28, at any one time, encompasses only a portion of the data which will eventually fill the target document. As the zones are moved, new portions of the data are encompassed. In general, each zone 18, 24, encompasses at least one and optionally two or more items of data in respective fields 22 that is/are to be incorporated into the target document. However, in different positions of the zones 18, 24, the data to be incorporated may be located in different fields 22, and similarly in the target zone 28. In some positions of the input zones, it is possible that fewer than all of the input zones may encompass data that is to be incorporated into the target zone.

Figure 2:
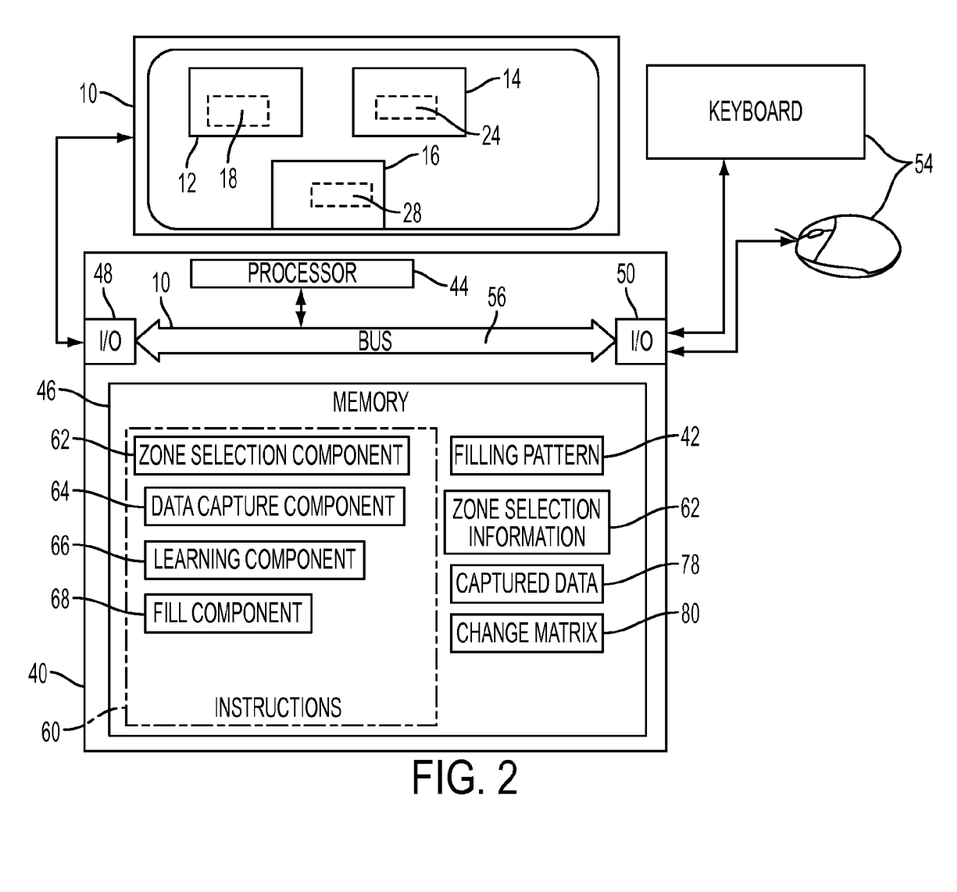
FIG. 2 is a functional block diagram illustrating a computer-implemented system for assisting a user to fill data in a target document in accordance with another aspect of the exemplary embodiment.

FIG. 2 shows a functional block diagram of an exemplary computer-implemented system 40 for assisting a user to enter data, by learning document-populating macros. The exemplary system allows the user to draw one (or several) virtual selection zones 18, 24, 28 on his screen. Each zone can be moved later to cover another area of the respective document 12, 14, 16. The selection zones 18, 24, 28 are used by the system 40 to learn candidate filling patterns 42 to propose to the user for the automation of the process of copying of remaining data.

The illustrated computer system 40 includes a processor 44, which controls the overall operation of the computer system 40 by execution of processing instructions which are stored in memory 46 connected to the processor 44. Computer system 40 also includes one or more interfaces 48, 50 for communication with external devices. The I/O interface 48 may communicates with a display device 52, for displaying information to users on the screen 10, while interface 50 communicates with a user input device, such as a keyboard 54 or touch or writable screen of the display device, and/or a cursor control device, such as mouse, trackball, or the like, for inputting text, and/or for communicating user input information and command selections to the processor 44. The various hardware components 44, 46, 48, 50 of the computer system 40 may be all connected by a bus 56.

Figure 3:
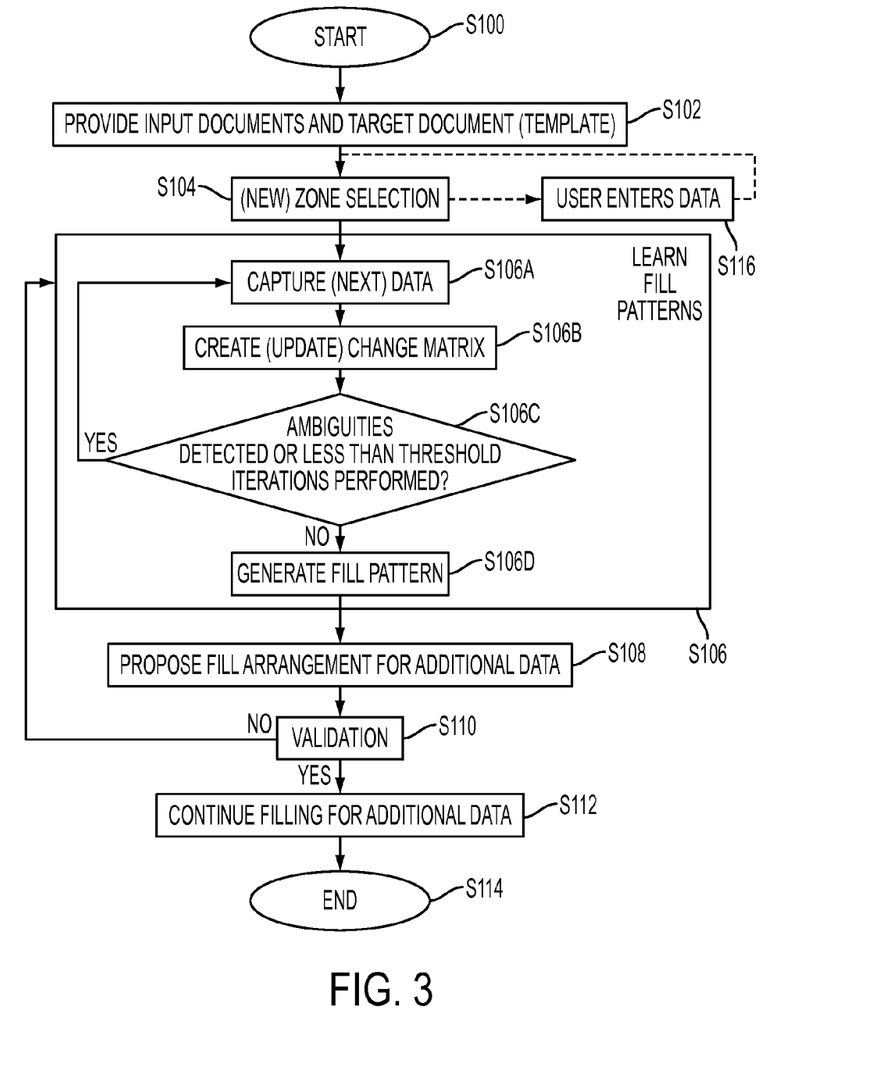
FIG. 3 is a flow chart illustrating a computer-implemented method for assisting a user to fill data in a target document in accordance with another aspect of the exemplary embodiment.

The processor 44 executes instructions 60 stored in memory 46 for performing the method outlined in FIG. 3. These include a zone selection component 62, a data capture component 64, a learning component 66, and a fill component 68. The zone selection component 62 provides for and receives information 76 regarding the user's zone selections and their current locations, and stores the information in memory 46. The zone selection component includes or accesses a recording component which is configured for recording actions between applications. This can be a very simple program that records keystrokes and mouse manipulations.

The data capture component 64 captures data within the zones 18, 24, 28 and stores the captured data 78 in memory 46. The data capture component 64 may include an optical character recognition (OCR) component if the data is captured by taking a screenshot (an image of what is on the screen). The learning component 66 applies a pattern learning algorithm for generating the filling pattern(s) 42 based on the captured data 78, which can include creating a change matrix 80. The fill component 68 automatically fills the target document with data using the generated filling patterns and the input documents 12, 14 or provides a matrix of data which the user can copy and paste into the target document.

The computer system 40 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 46 may represent any type of non-transitory computer readable medium such as random access memory (RAM), read only memory (ROM), magnetic disk or tape, optical disk, flash memory, or holographic memory. In one embodiment, the memory 46 comprises a combination of random access memory and read only memory. In some embodiments, the processor 44 and memory 46 may be combined in a single chip. The digital processor 44 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 40. Since the configuration and operation of programmable computers are well known, they will not be described further.

The filling pattern 42, which the system's learning component is capable of recognizing, represents a transfer of data from a source application 12, 14 to the target final document 16. In order to assess this correspondence, in one embodiment, the system may only consider the "cut and paste" operations performed by the user, which enables the system to identify corresponding data from the input documents with data in the target document.

Paste operations can be analyzed according to different document types. For example, if the source and the target are both tables, then the system may analyze how data are copied from the source table into the target table. Several such manipulations may be observed for the system to reach a conclusion about the most probable pattern. If, for example, data from the input documents are in a column and are copied to a row in the target table, then the system can propose, as a pattern, a copy from a column into a row.

As will be appreciated, the filling pattern 42 can be much more complex if more than one input document is used. In that case, the different cut and paste operations may intertwine data in the final document. In this case, the learning component will try to learn how the different data are copied from these sources into the final target document. The learning component may use, as pattern learning information, the sequence in which the manipulations are performed or the order of the different data in the final document together with their origin. Patterns may also be detected from manipulations between text documents or program codes. These patterns could be either predefined or automatically learnt with a machine learning system. In the latter case, for example, the system may compare the final aspect of the target documents with the different keystrokes involved together with the source documents in order to define a better pattern, if the same case occurs again.

When recording keystrokes, the system may also record the use of the "undo" keystroke by the user. This removes the last keystrokes from the pattern computing.

As will be appreciated, the learning component 66 may detect more than one pattern, which may be presented to the user as alternates. If the user selects one pattern instead of another, then this pattern may be assigned a higher weight for the next set of documents, should the observations be analogous.

The pattern detection process enables the system to pre-fill a buffer, such as a matrix of data, with all reaming data to be copied from the input documents to the target document. When the system is confident enough in what it has learned, it can start proposing, to the user, the content of this buffer as a final "cut and paste".

The zone selection component 62, which allows a user to draw and move selection zones on his screen and the learning component 66, which learns patterns from the way data is duplicated by the user from these input zones to the target zone, are described in greater detail below.

FIG. 3 illustrates an exemplary method for assisting a user to enter data, which may include generating a fill pattern and applying the fill pattern for autocompletion of a target document. The method begins at S100. At S102, input and target documents are provided, e.g., by a user opening them on his or her computer and which are displayed on the screen.

At S104, provision is made for a user to select zones 18 24, 28 in the input and target documents, e.g. by drawing rectangular bounding boxes, and information 66 on the user's zone selections is stored in memory 46 by the zone selection component 62.

At S106, by observing the user's entries in the target zone 28 of the target document 16 and the corresponding input zones 18 24, of the input documents 12, 14 from which the data is assumed to be derived, one or more filling patterns 42 are learned by the learning component 66. This step may include capturing a first set of input data when the input zones 18 24 are each in a respective first location at a first time and capturing a first set of target data when the target zone is in a first location at (or approximately at) the first time, and subsequently capturing a second set of input data when the input zones 18 24 are each in a respective second location, spaced from their first locations, at a second time, and capturing a second set of target data when the target zone 28 is in a second location, spaced from the first location, at (or approximately at) the second time. This allows the system to identify and store links between the cells (or other defined data locations 22) in the input zone(s) from which the data is derived and the corresponding cells (or other defined data locations 32) of the target zone 28 in which the data is incorporated and to resolve ambiguities which could arise when only one set of data is collected from each of the input zones and target zones. As will be appreciated, the collection of data may be performed at more than two times.

At S108, a proposal for filling additional data into the target document 16 is generated by the fill component, using the fill pattern(s) 42, and may be displayed to the user as a fill arrangement, such as matrix, e.g., on the display screen 10.

At S110, the user may validate the filling pattern 42, or ask the system to continue learning the fill pattern (the method then returning to S106) or suggest modifications to the filling pattern 42.

If the user validates the filling pattern, the method continues to S112, where the system continues to process the remaining data. The method ends at S114.

At S116, which is a user implemented step, the user enters data 32 in the target zone. This step may proceed at the same time as S106.

As will be appreciated, the steps of the method need not all proceed in the order illustrated and fewer, more, or different steps may be performed.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for generating and applying fill patterns.

Aspects of the exemplary system and method will now be described in further detail.

A. Zone Selection (S104)

In this stage the user defines a set of selection zones 18, 24, 28. Each input zone 18, 24 encompasses the data 22 in a respective input document 12, 14 which the user will select from in entering data 32 in a target zone 28 of an target document 16 (FIG. 1). For example a first input zone 18 may encompass a set of data cells forming an (n×m) array, wherein at least one of n and m is greater than 1. A second input zone 24 (optional) may encompass a set of data cells forming an (p×q) array, wherein at least one of p and q is greater than 1. The target zone 28 may encompass a set of data cells forming an (r×s) array, wherein at least one of r and s is greater than 1. Each of n, m, p, q, r, and s, can be the same or different, e.g., from 1-10 cells. To ease visibility, documents are positioned so that the zones 18, 24, 28 are spaced from each other on the screen 10.

By way of example, the zone selection may proceed as follows:

S104A: The user activates the creation of a selection zone, such as zone 18. This can be performed, for example, with a predefined sequence/set of user actuations of the user input device(s) 54 that is recognized by the system 40, such as by hitting a specific combination of keyboard keys (e.g., Ctr+A+C) which activates a specific command by the software of zone selection component 62 that manages the selection zone. Then, the user generates a bounding box 20 for the zone. For example (e.g., while maintaining his fingers on the zone selection combination of keys), the user performs steps which are recognized by the zone selection component 62 as defining the selection of the size and location of the selection zone, such as the following:

S104A1: move the mouse cursor to the upper left corner of the selection zone he wants to create, S104A2: click on the left button of the mouse and maintain the click, S104A3: drag the mouse cursor to the lower right corner of the desired selection zone, and S104A4: release the right click.

S104B: The zone selection component 62 stores the dimensions and location of the zone together with an index for the zone 18. It then generates a border 20 which appears on screen surrounding the selection zone. The border is clearly defined so that it is easy for the user to locate when searching for it on the screen. For example, the border 20 may be colored in a distinct color for the respective document, or otherwise distinguished.

S104C: The user can repeat process S104A to create other selection zones. The borders 26 can be displayed in different colors to facilitate their location.

S104D: When the user has finished defining all the input zones, he now defines an target zone 28, which may involve actuating a different specific combination of keyboard keys (e.g., Ctr+A+V), or other set of actuations of input device(s) 54, that is recognized by the system 40. The user then defines the shape and location of the zone 28, e.g., (while he maintaining his fingers on these keys), he performs the following steps:

S104D1: move the mouse cursor to the upper left corner of the selection zone he wants to create, S104D2: click on the left button of the mouse and maintain the click, S104D3: drag the mouse cursor to the lower right corner of the desired selection zone, and S104D4: release the right click.

S104E: The zone selection component 62 stores the dimensions and location of the zone 28 together with an index for the zone. It then generates a border 30 which appears on screen surrounding the selection zone 28.

As illustrated in FIG. 1, the borders 20, 26, 30 are clearly visible on the screen 10 at the same time. To ease visibility, the borders 20, 26, 30 may be thicker than the borders (if any) which define the cells of the array in the respective documents and/or may be colored with distinctive colors to facilitate their location. In one embodiment, the color can be changed according to user convenience, for example, by left clicking on the frame border which displays a color customization pane Each border 20, 26, 30 is movable. This can be achieved with a predefined sequence/set of user actuations on the user input device(s) that is recognizable by the zone selection component 62. For example, the user may locate the mouse cursor on the border 20, 26, 30, then right click, maintain the click, move the cursor on the screen to the desired location, then release the click to fix the frame at the new location. As described below, the border 20, 26, 30 are moved once the user has completed entry of data from zones 18, 24 into particular zone 28 of the target document.

The border 20, 26, 30 defines an interior which is both transparent and empty. This means that the user is able to click inside the border on the text appearing in the respective zone 18, 24, 28, for example, to be able select it to perform a conventional copy-paste operation.

B. Learning (S106)

Once all the selection zones 18, 24, 28, have been defined, the user starts to work. In this stage, the user inputs data 32 into the target zone 28 based on data 22 displayed within the input zones 18, 24. This can be performed by any conventional operation, such as cutting and pasting, typing, data manipulation, such as summing, subtracting, averaging, and the like. The system detects and records the changes made in the target zone 28. For example during the learning phase, at S116, the user may perform some or all of the following tasks.

S116A: Look for the data 22 he needs in the current first input zone 18 and copy the relevant data in the current target zone 28 that he wants to update. This may be performed using a standard copy-past step command.

S116B: Look for the data 22 he needs inside in the current second (or other) input zone 24 (or return to S116A to select additional data in the in the current first input zone 18) and copy the relevant data in the current target zone 28 that he wants to update (See FIG. 4)

S116C: When the user has finished filling data in the first target zone 28, he moves to the next parts of the documents to be processed. For example, he drags down all the frames 20, 26, 30 to define new input and target zones in new parts of the documents that he is working on, which become the current zones. The method returns to S116A, where the user starts to fill new data in the new (now current) target zone 28.

While the user is performing these tasks at S116, the system learns (at S106) what kind of data is used and where it comes from in order to be able to suggest an automatic completion (at S108). The learning phase may include the following substeps:

S106A: capture current data 22, 32 in zones 18, 24, 28 and store the data in input and output matrices.

S106B: create a change matrix 80 which captures a potentially ambiguous mapping between the data 22 and the data 32.

S106C: check for ambiguities in the change matrix 80. If at S106, there are ambiguities in the change matrix, the method returns to S106A, where new data is captured and the change matrix is updated at S106B, potentially reducing the number of ambiguities. Otherwise, the method may proceed to S106D. In some embodiments, the method may return to S106A for a predetermined number of iterations or for a predetermined amount of time even if no ambiguities are detected. This may be to provide confirming data, and to allow for the fact that data may be missing from some cells, and therefore is not copied in the first or subsequent iterations and/or is modified before input.

S106D: generate a filling pattern 42.

Further details on these substeps are now provided.

The data capture step (S106A) involves capturing data 22, 32 in the input and target zones. This may be performed periodically or intermittently on a suitable schedule. For example, a "data snapshot" may be generated e.g., by capturing a screenshot of the user's screen and performing optical character recognition (OCR) to extract the data from within the delimited zones. This may be performed every few seconds, or each time a new cell is filled. Alternatively, the data 22, 32 may be captured each time the user translates one or more of the borders 20, 26, 30 to a new position on the respective document. In other embodiments, the system captures the copy and paste keystrokes performed by the user. The data collected is only in the current zones 18, 24, 28, with data outside those zones being ignored.

The learning component 66 places the captured data from each of the zones in a respective matrix 70, 72, 74 which serves as a temporary buffer for the data. The learning component 66 creates a change matrix 80, which has the same dimensions (r×s) as the matrix 74 containing the data 32 of the target zone 30. For example, in the case of the documents illustrated in FIG. 4, the current data in the target zone 28 is stored by the system in a target matrix 74 of four cells in width and two cells in length (partial cells in the target zone are ignored) so a 4×2 cell change matrix 80 is created. The purpose of the change matrix 80 is to find a unique link between each cell of the target matrix 74, and a maximum of one cell of only one of the respective input zone matrices 70, 72 which store the current data in the input selection zones 18, 24. At the beginning of the learning phase, each cell in the change matrix 80 can potentially be populated by the content of any cell from any input matrix 70, 72. In the learning phase, an object is to reduce the number of possibilities to just one. The ambiguities may arise because two or more cells of the input matrices 70, 72 (or target matrix 74) have the same value. For example, in FIG. 1, both Jim and Sue have worked 1 week on Project A, so the system does not know from which cell of the input matrix is the 1 value in the target matrix. Similarly in FIG. 4, the value "X" appears in two input matrices 70, 72. To complicate matters further, two cells of the target matrix 74 include the same value "X".

The method at S106B can proceed as follows: For each of the cells of the target zone matrix 74 in turn:

S106B1: Look for a match between the content of a cell of the target matrix 82 and the same content appearing in a cell of input matrix 70 or 72. Initially, there might be several possibilities. For example, in the target matrix 74 shown in FIG. 4, the "X" values may each come from cell i(a,b) of input matrix i (matrix 70), or from cell j(c,d) of input matrix j (matrix 72). To allow for OCR errors, some variation may be permitted in what is considered a match, for example by defining an edit distance between the two data strings.

S106B2: Record all possibilities for that cell in the corresponding cell of the change matrix 80. In the illustration shown in FIG. 4, at this point, the related cells of the change matrix will contain two possible links, i.e., to cells i(a,b) and j(c.d)).

S106B3: Resolve ambiguities (subsequent iterations).

At the end of the first iteration of S106B, some cells of the change matrix 80 may contain no links (because no data have been recorded in related cells of matrix 82), some of the cells may contain one unique link to a cell from a given input matrix 70 or 72, and some cells may have ambiguities (meaning multiple links to possible sources of data (different cells in the same or different input selection matrices 70, 72). These ambiguities are generally reduced after studying another set of input zones (S106A), when new data has been added by the user to the target document, e.g., through cut and paste operations.

Figure 4:
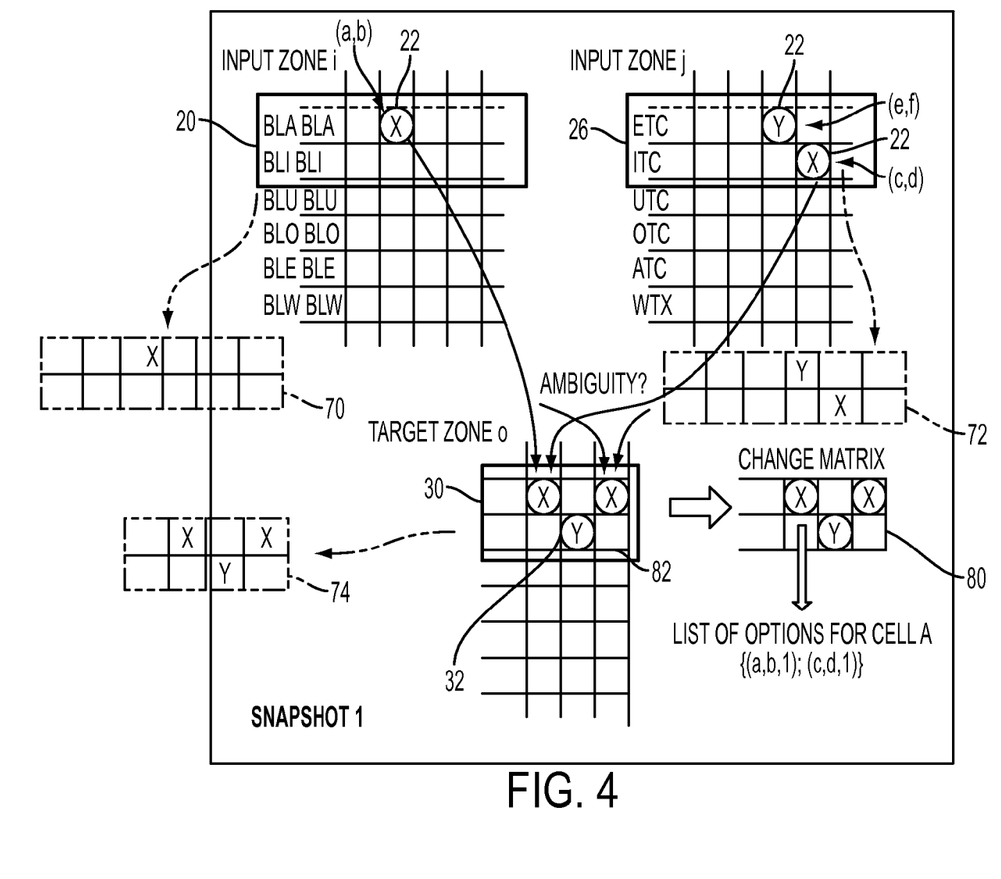
FIG. 4 illustrates definition of input and target zones and data update in the exemplary method.
Figure 5:
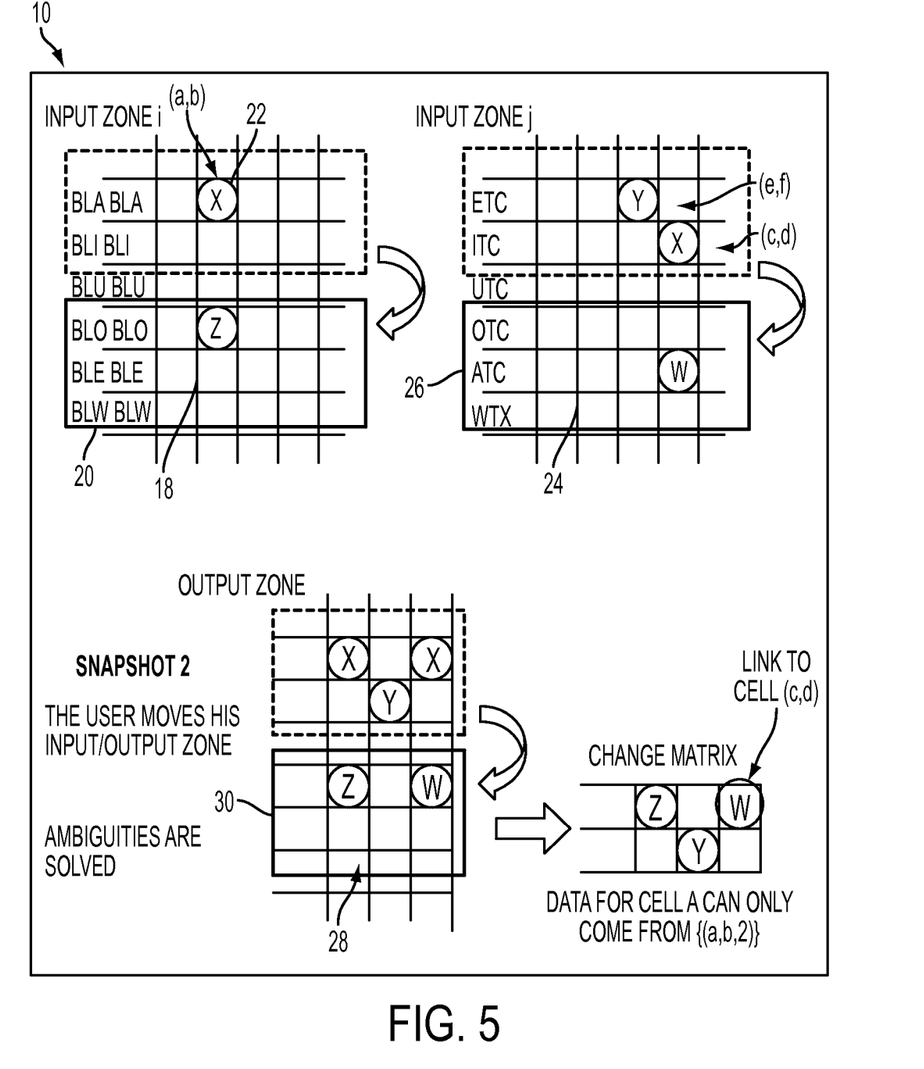
FIG. 5 illustrates the learning mechanism used in the exemplary method with disambiguation functionality.

If there are still unresolved ambiguities in the change matrix (S106C) then the system performs another learning cycle. Once the user has finished copying data appearing in the input selection zones 18, 24 (S116), he moves to the next parts of the documents to be processed (i.e., the method returns to S104). To do so, he drags down (or otherwise translates) the respective borders 20, 26, 30 for the input and target zones 18, 24, 28 to new areas of these documents to be processed and he starts copying new data (S116). FIG. 5 illustrates the translation of the three borders 20, 26, 30 (and their respective zones 18, 24, 28) for the documents shown in FIG. 4, by way of example. As can be seen from FIG. 5, the zones remain of the same size as in their previous locations (same number of cells on each row), only the position of the zone changes. The new input and output zones 18, 24, 28 now include different data, but a pattern begins to emerge as to where the data in the target zone is derived from within the input zones.

Then the system continues to learn. For example, at the next iteration of S106B, for each of the cells of the target matrix 74, the system once again looks for a possible match between the cell content of the target matrix 74 and similar content appearing in another cell of an input selection matrix (S106B1). At this point there may be ambiguities or a unique solution. For example, in FIG. 5, value "Z" can be uniquely attributed to cell i(a,b) from input matrix i. Value "W" confirms the link to j(c.d). As will be appreciated, W could have been positioned in the cell corresponding to Y and the disambiguation would still have been possible, in this case.

The links are recorded. (S106B2). In particular, for all cells in the change matrix, the system compares all possibilities already recorded for that cell (e.g., in FIG. 4, "X" could come from i(a,b) or j(c,d)) with the new possibilities identified in this new cycle (e.g., in FIG. 5, "Z" can only come from i(a,b)).

Figure 6:
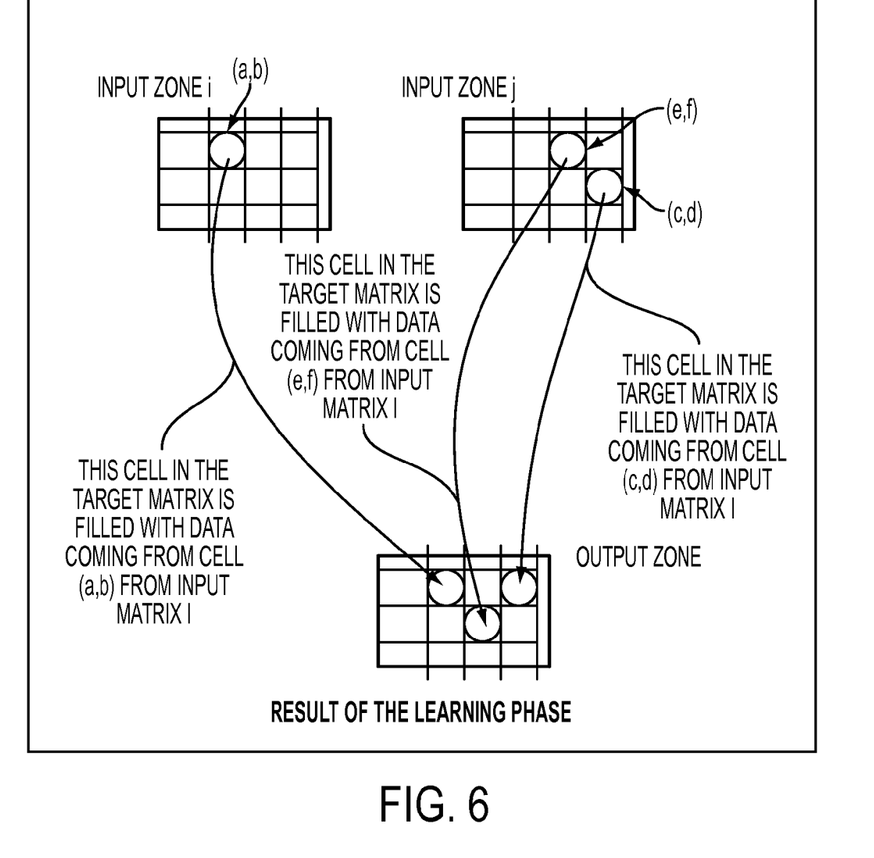
FIG. 6 illustrates the result of the learning phase of the exemplary method.

If there was no previously recorded possible link for that cell then the system records the new set of possibilities for the cell in the change matrix. Otherwise, if for that cell there is already a list of possible links (1 or many), the system keeps only those that appear both in the list of already recorded possibilities for that cell and the new set of possibilities (e.g., in the example i(a,b) is the only link that exists in the previous list of possibilities and the new list for the cell having the value Z. Therefore i(a,b) is recorded as the unique link for that cell in the change matrix 80, as illustrated in FIG. 6. This last step is the ambiguity resolution step (S106B3).

At the end of this iteration of S106B, if there are no more ambiguities in the change matrix, then the system may proceed to S106D, where a fill pattern is generated, otherwise it continues the learning phase at S106A.

As will be appreciated the change matrix 80 may be updated two or more times for each iteration of S106B, for example, if data is automatically captured at intervals, such as every few seconds. In such cases, the system may store a list of changes in the captured data, so that only the cells of the target matrix for which there is a change are reevaluated for possible links.

Once the detected ambiguities have been resolved, the fill pattern is generated (S106D). The fill pattern 42 specifies how each cell in the target document matrix 74 is to be populated, based on the data in the input matrices 70, 72. This information is extracted from the change matrix 80. It also defines how the matrices translate between each target matrix population.

For example, in the illustration in FIG. 4, the fill pattern 42 may include pseudocode as follows:

```
translate i 3 cells down,
translate j 3 cells down,
translate o 3 cells down,
apply change matrix:
    [copy data from i(a,b) to o(g,h),
    copy data from j(e,f) to o(j,k),
    copy data from j(c,d) to o(l,m)],
repeat to end.
```

B. Fill (S108)

Once there are no more ambiguities in the change matrix 80 (and/or after a predetermined threshold number of iterations or time) the system can start helping the user to copy or otherwise compute the remaining data using the generated filling pattern 42.

The fill component 68, virtually drags drown the input selection zones 18, 24 automatically, to new parts of the documents that remain to be processed and copies the data in these zones into respective input selection matrices 70, 72.

Using the links defined in the change matrix 80, the system feeds all cells of the target matrix 74. For each of the cells of the target matrix, it uses the unique link recorded for that cell in the change matrix, to retrieve where to look for in the set of input matrices to get the data that should be copied for that cell. Once the target matrix is updated, the system may propose the result to the user for validation (S110). If the user does not agree with the result, he can indicate, for example, through a combination of keys pressed (e.g., Ctr-X), that the system should continue to learn. In that case the method returns to S106.

If the user is satisfied with the formatted data, he can copy-paste the results on to the target document 16, or request the system to do so. The system then continues to process the remaining parts of the input documents (S112).

The change matrix 80 may be displayed on the screen, e.g., in a separate window 90 (FIG. 1), to allow the user to assess whether it is correct. If the system detects more than one pattern, or there are ambiguities in data generation for the buffer, these may be displayed also. If there are ambiguities, a specific button 92 on the change matrix window 90 can allow the user to switch between data distributions to select the distribution that reflect the pattern he has in mind. If none of the solutions matches the user's intent, then he can input more keystrokes until he is satisfied with the result.

To assist the user in assessing the pattern used in generating the target matrix, an animation can be displayed on the screen to show from which area specific data at a specific location in the output matrix comes from (e.g., from which row and column of which input document).

The method described above assumes that the user does not slide the documents 12, 14, 16 on the screen during the learning stage. To address the possibility for this, the system may observe changes in a fixed position 94 in each document and account for any movement in the cells.

The exemplary method allows patterns to be generated for a variety of input and target document types and in particular, when at least one of the documents 12, 14 is not a spreadsheet. While patterns for spreadsheet documents may be simplified by assuming regularities from one column to another or one line to another, such a method does not work for data coming from different types of documents.

Furthermore, visual macro works thank to a learning phase where the user teach himself the system what type of repetitive task he want. To our knowledge there is no such automatic graphical learning of user intent. Here we speak about dynamic learning.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting a user to enter data, comprising:
for each of at least one input documents displayed on a user's screen, detecting a user's selection of a moveable input zone on the input document;
for a target document displayed on the user's screen, detecting a user's selection of a moveable target zone on the target document;
capturing data in the input zone of the at least one input document and capturing data in the target zone of the target document, the data captured in the target zone comprising data entered by the user;
learning a pattern for filling additional data in the target document based on the captured data, comprising generating a change matrix comprising an array of cells, the change matrix representing links between cells of a matrix representing the target zone with respective cells of a matrix representing the input zone from which data entered in the target zone is potentially derived; and generating a fill arrangement for the additional data in the target document based on the learned pattern.

2. The method of claim 1, wherein at least one of the detecting, capturing, learning, and generating is performed with a computer processor.

3. The method of claim 1, wherein the at least one input document comprises a plurality of input documents.

4. The method of claim 3, wherein at least one of the input document is a different type from another of the input documents, the document types being selected from text document, spreadsheet document, and slide presentation document.

5. The method of claim 1, wherein the method includes displaying a boundary of the selected input zone and a boundary of the selected target zone on the user's screen.

6. The method of claim 1, wherein the capturing data in the target zone and the capturing data in the input zone comprises recording copy and paste operations by the user in the target zone and input zone.

7. A method for assisting a user to enter data, comprising:
for each of at least one input documents displayed on a user's screen, detecting a user's selection of a moveable input zone on the input document;
for a target document displayed on the user's screen, detecting a user's selection of a moveable target zone on the target document;
capturing data in the input zone of the at least one input document and capturing data in the target zone of the target document, the data captured in the target zone comprising data entered by the user, at least one of the capturing data in the target zone and the capturing data in the input zone comprising capturing a screenshot of the user's screen;
learning a pattern for filling additional data in the target document based on the captured data; and
generating a fill arrangement for the additional data in the target document based on the learned pattern.

8. The method of claim 7, wherein the capturing data comprises performing optical character recognition to extract data within the at least one of the target zone and the input zone.

9. The method of claim 1, wherein the capturing data in the input zone comprises capturing a first set of input data when the input zone is in a first location and capturing a second set of input data when the input zone is in a second location and the capturing data in the target zone comprises capturing a first set of target data when the target zone is in a first location and capturing a second set of target data when the target zone is in a second location.

10. The method of claim 1, wherein the method further comprises:
for each of the at least one input documents, detecting a movement of the input zone from a first location on the input document to a new location on the input document;
for the target document, detecting a movement of the target zone from a first location on the target document to a new location on the target document;
capturing data entered by the user in the target zone of the target document and capturing data in the input zone in the new locations;
the learning of the pattern for filling data in the target document comprising resolving ambiguities with respect to a source of the data in the target zone based on the captured data for the first locations and the new locations on the input and target documents.

11. The method of claim 7, wherein the learning of the pattern for filling data comprises generating a change matrix comprising an array of cells, the change matrix representing links between cells of a matrix representing the target zone with respective cells of a matrix representing the input zone from which data entered in the target zone is potentially derived.

12. The method of claim 1, wherein when a cell of the change matrix includes more than one link representing an ambiguity as to a cell of the input zone matrix from which data entered in the target zone is potentially derived, the method comprises repeating the capture of data after movement of the input and target zones to new locations in the respective input and target documents.

13. The method of claim 1, further comprising proposing the fill arrangement for additional data to the user.

14. The method of claim 13, wherein the proposing comprises presenting a matrix of data, derived from the at least one input document using the fill pattern, to the user for validation.

15. The method of claim 1, further comprising autofilling the target document with the additional data.

16. A computer program product comprising a non-transitory recording medium storing instructions, which when executed on a computer, causes the computer to perform the method of claim 1.

17. A system which performs the method of claim 1 comprising non-transitory memory which stores instructions for performing the method and a processor in communication with the memory which executes the instructions.

18. A system for assisting a user to enter data, comprising:
a display screen which displays at least one input document and a target document, a moveable input zone being defined within a border displayed on each of the at least one input document and a moveable target zone being defined within a border displayed on the target document;
a zone selection component which provides for a user to define the borders of the at least one input zone and the target zone and which detects a location of the selected input zone and a location of the selected output zone on the display screen;
a data capture component which automatically captures data in the input zone of each of the at least one input documents as a respective input zone matrix of values and captures data in the target zone, as a target zone matrix of values, in their current locations;
a learning component which learns a pattern for filling additional data in the target document, the pattern being learned based on the captured data for first locations of the moveable input zone and moveable target zone and on captured data for second locations of the moveable input zone and moveable target zone by finding a unique link between each cell of the target zone matrix, and a maximum of one cell of only one of the respective input zone matrices; and
a fill component for proposing a fill arrangement for the additional data in the target document, based on the learned pattern.

19. The system of claim 18, further comprising a computer processor which implements the zone selection component, data capture component, learning component, and fill component.

20. The system of claim 18, further comprising a user input device and wherein the zone selection component detects actuations of the user input device corresponding to cut and paste operations which copy data from the input zone to the target zone.

21. A method for assisting a user to enter data, comprising:

providing for a user to define a first moveable input zone on a first input document displayed on a user's screen, a second moveable input zone on a second input document displayed on the user's screen, and a moveable target zone on a target document displayed on the user's screen;

providing for the user to enter data in the target document while the target zone is in a first location of the target zone;

capturing data in the input zones of the first and second input documents in first locations of the input zones;

capturing data in the target zone of the target document in the first location of the target zone;

providing for a user to translate the first moveable input zones from the first locations to second locations of the input zones and to translate the target zone from the first location of the target zone to a second location of the target zone;

providing for the user to enter new data in the target document while the target zone in the second location of the target zone;

capturing data in the input zones of the first and second input documents in the second locations of the input zones;

capturing data in the target zone of the target document in the second location of the target zone;

learning a pattern for filling additional data in the target document based on the captured data in the input zones and target zone in the first and second locations of the input and target zones; and generating a fill arrangement for the additional data in the target document based on the learned pattern.

22. The system of claim 18, wherein at least one of the capturing data in the target zone and the capturing data in the input zone comprises capturing a screenshot of the user's screen.

* * * * *